(12) United States Patent
Son et al.

(10) Patent No.: US 10,901,184 B2
(45) Date of Patent: Jan. 26, 2021

(54) OPTICAL IMAGING SYSTEM

(71) Applicant: Samsung Electro-Mechanics Co., Ltd., Suwon-si (KR)

(72) Inventors: Ju Hwa Son, Suwon-si (KR); Jong Gi Lee, Suwon-si (KR); Yong Joo Jo, Suwon-si (KR); Ju Sung Park, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 276 days.

(21) Appl. No.: 16/152,779

(22) Filed: Oct. 5, 2018

(65) Prior Publication Data

US 2019/0250378 A1    Aug. 15, 2019

(30) Foreign Application Priority Data

Feb. 9, 2018    (KR) .................... 10-2018-0016407

(51) Int. Cl.
*G02B 13/00* (2006.01)
*G02B 9/62* (2006.01)

(52) U.S. Cl.
CPC .......... *G02B 13/0045* (2013.01); *G02B 9/62* (2013.01)

(58) Field of Classification Search
CPC ............................ G02B 13/0045; G02B 9/62
USPC ......................................................... 359/713
See application file for complete search history.

(56) References Cited

U.S. PATENT DOCUMENTS

| 9,726,858 | B2 | 8/2017 | Huang |
| 2014/0293453 | A1 | 10/2014 | Ogino et al. |
| 2016/0004047 | A1 | 1/2016 | Iwasaki et al. |
| 2016/0033744 | A1 | 2/2016 | Tsai et al. |
| 2016/0187620 | A1 | 6/2016 | Huang |
| 2016/0187622 | A1 | 6/2016 | Huang |
| 2017/0017064 | A1* | 1/2017 | Jo ................. G02B 13/0045 |
| 2017/0299846 | A1 | 10/2017 | Lin et al. |
| 2019/0250378 | A1 | 8/2019 | Son et al. |

FOREIGN PATENT DOCUMENTS

| CN | 106990511 A | 7/2017 |
| CN | 209356742 U | 9/2019 |

OTHER PUBLICATIONS

Korean Office Action dated Feb. 25, 2019 in corresponding Korean Patent Application No. 10-2018-0016407 (6 pages in English and 5 pages in Korean).
Chinese Office Action dated Dec. 2, 2020, in counterpart Chinese Patent Application No. 201811541052.4 (4 pages in English, 5 pages in Chinese).

\* cited by examiner

*Primary Examiner* — Collin X Beatty
(74) *Attorney, Agent, or Firm* — NSIP Law

(57) ABSTRACT

An optical imaging system includes a first lens, a second lens, a third lens, a fourth lens, a fifth lens, and a sixth lens sequentially arranged in numerical order from an object side of the optical imaging system toward an imaging plane of the optical imaging system and each having a refractive power, wherein an entire field of view of the optical imaging system is 50° or greater, and TTL/f<1.0, where TTL is a distance from an object-side surface of the first lens to the imaging plane, and f is an overall focal length of the optical imaging system.

17 Claims, 7 Drawing Sheets

OPTICAL IMAGING SYSTEM

CROSS-REFERENCE TO RELATED APPLICATIONS

This application claims the benefit under 35 USC 119(a) of Korean Patent Application No. 10-2018-0016407 filed on Feb. 9, 2018, in the Korean Intellectual Property Office, the entire disclosure of which is incorporated herein by reference for all purposes.

BACKGROUND

1. Field

This relates to a telescopic optical imaging system including six lenses.

2. Description

Small camera modules are mounted in mobile communications terminals. For example, the small camera modules may be mounted in thin devices such as mobile phones. Such a small camera module includes an optical imaging system including a small number of lenses so that it may be made thin. For example, the optical imaging system of the small camera module includes four or fewer lenses. However, it is difficult to implement telescopic characteristics and high resolution characteristics in such an optical imaging system including only four or fewer lenses.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an optical imaging system includes a first lens, a second lens, a third lens, a fourth lens, a fifth lens, and a sixth lens sequentially arranged in numerical order from an object side of the optical imaging system toward an imaging plane of the optical imaging system and each having a refractive power, wherein an entire field of view of the optical imaging system is 50° or greater, and $TTL/f<1.0$, where TTL is a distance from an object-side surface of the first lens to the imaging plane, and f is an overall focal length of the optical imaging system.

A plurality of inflection points may be formed on an object-side surface of the third lens.

$D34/D45<1.0$ may be satisfied, where D34 is a distance from an image-side surface of the third lens to an object-side surface of the fourth lens, and D45 is a distance from an image-side surface of the fourth lens to an object-side surface of the fifth lens.

$0.52<f1/f<0.57$ may be satisfied, where f is the overall focal length of the optical imaging system, and f1 is a focal length of the first lens.

$1.6<Nd2$ may be satisfied, where $Nd2$ is a refractive index of the second lens.

$1.6<Nd3$ may be satisfied, where $Nd3$ is a refractive index of the third lens.

$1.6<Nd4$ may be satisfied, where $Nd4$ is a refractive index of the fourth lens.

In another general aspect, an optical imaging system includes a first lens, a second lens, a third lens, a fourth lens, a fifth lens, and a sixth lens sequentially arranged in numerical order from an object side of the optical imaging system toward an imaging plane of the optical imaging system, wherein the second lens has a negative refractive power, the fifth lens has a positive refractive power, and $TTL/f<1.0$, where TTL is a distance from an object-side surface of the first lens to the imaging plane, and f is an overall focal length of the optical imaging system.

$0.5<DT4/D45<1.0$ may be satisfied, where DT4 is a thickness of the fourth lens, and D45 is a distance from an image-side surface of the fourth lens to an object-side surface of the fifth lens.

An image-side surface of the second lens may be concave.

An object-side surface of the fourth lens may be convex.

An image-side surface of the fifth lens may be concave.

An object-side surface of the sixth lens may be convex.

The optical imaging system may further include a stop disposed between the first lens and the second lens.

Four inflection points may be formed on an object-side surface of the third lens.

An inflection point may be formed on each of an object-side surface of the sixth lens and an image-side surface of the sixth lens.

In another general aspect, an optical imaging system includes a first lens, a second lens, a third lens, a fourth lens, a fifth lens, and a sixth lens sequentially arranged in numerical order from an object side of the optical imaging system toward an imaging plane of the optical imaging system and each having a refractive power, wherein at least four inflection points are formed on an object-side surface of the third lens, an inflection point is formed on an object-side surface of the fifth lens, an inflection point is formed on each of an object-side surface of the sixth lens and an image-side surface of the sixth lens, and $TTL/f<1.0$, where TTL is a distance from an object-side surface of the first lens to the imaging plane, and f is an overall focal length of the optical imaging system.

An entire field of view of the optical imaging system may be 50° or greater.

The second lens may have a negative refractive power, and the fifth lens may have a positive refractive power.

Respective refractive indices of the second lens, the third lens, and the fourth lens may be greater than respective refractive indices of the first lens, the fifth lens, and the sixth lens.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
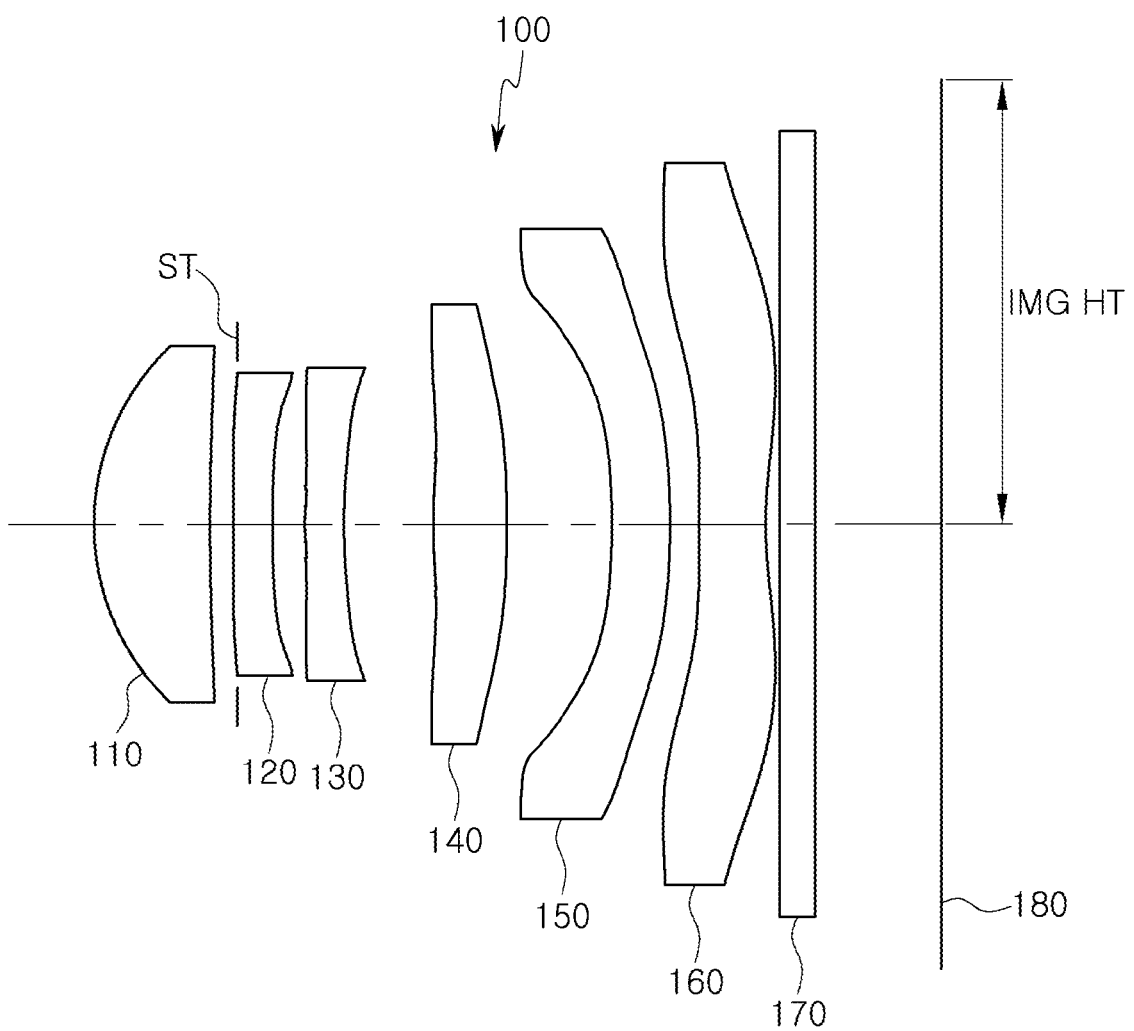
FIG. 1 is a view illustrating a first example of n optical imaging system.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

In this application, a first lens is a lens closest to an object (or a subject), while a sixth lens is a lens closest to an imaging plane (or an image sensor). All of radii of curvature and thicknesses of lenses, a TTL (a distance from an object-side surface of the first lens to the imaging plane), an IMG HT (half of a diagonal length of the imaging plane), and focal lengths of the lenses are expressed in millimeters (mm). Thicknesses of the lenses, distances between the lenses, and the TTL are distances measured along optical axes of the lenses. Further, in a description of shapes of the lenses, a statement that a surface of a lens is convex means that at least a paraxial region of the surface is convex, and a statement that a surface of a lens is concave means that at least a paraxial region of the surface is concave. Therefore, although it may be stated that a surface of a lens is convex, an edge portion of the lens may be concave. Likewise, although it may be stated that a surface of a lens is concave, an edge portion of the lens may be convex.

In the examples described in this application, an optical imaging system includes six lenses. For example, the optical imaging system may include a first lens, a second lens, a third lens, a fourth lens, a fifth lens, and a sixth lens sequentially arranged in numerical order from an object side of the optical imaging system toward an imaging plane of the optical imaging system. The first to sixth lenses may be disposed so that there is a first air gap between the first lens and the second lens, a second air gap between the second lens and the third lens, a third air gap between the third lens and the fourth lens, a fourth air gap between the fourth lens and the fifth lens, and a fifth air gap between the fifth lens and the sixth lens. Thus, an image-side surface of one lens is not in contact with an object-side surface of a next lens closer to the imaging plane.

The first lens may have a refractive power. For example, the first lens may have a positive refractive power. One surface of the first lens may be convex. For example, an object-side surface of the first lens may be convex.

The first lens may have an aspherical surface. For example, both surfaces of the first lens may be aspherical. The first lens may be formed of a material having a high light transmissivity and an excellent workability. For example, the first lens may be formed of plastic. However, a material of the first lens is not limited to plastic. For example, the first lens may be formed of glass. The first lens may have a low refractive index. For example, the refractive index of the first lens may be less than 1.6.

The second lens may have a refractive power. For example, the second lens may have a negative refractive power. One surface of the second lens may be concave. For example, an image-side surface of the second lens may be concave.

The second lens may have an aspherical surface. For example, an object-side surface of the second lens may be aspherical. The second lens may be formed of a material having a high light transmissivity and an excellent workability. For example, the second lens may be formed of plastic. However, a material of the second lens is not limited to plastic. For example, the second lens may be formed of glass. The second lens may have a refractive index higher than that of the first lens. For example, the refractive index of the second lens may be 1.65 or greater.

The third lens may have a refractive power. For example, the third lens may have a negative refractive power. One surface of the third lens may be convex. For example, an object-side surface of the third lens may be convex. Inflection points may be formed on the third lens. For example, four inflection points may be formed on an object-side surface of the third lens.

The third lens may have an aspherical surface. For example, both surfaces of the third lens may be aspherical. The third lens may be formed of a material having a high light transmissivity and an excellent workability. For example, the third lens may be formed of plastic. However, a material of the third lens is not limited to plastic. For example, the third lens may be formed of glass. The third lens may have a high refractive index. For example, the refractive index of the third lens may be 1.6 or greater.

The fourth lens may have a refractive power. For example, the fourth lens may have a positive refractive power. One surface of the fourth lens may be convex. For example, an object-side surface of the fourth lens may be convex.

The fourth lens may have an aspherical surface. For example, an object-side surface of the fourth lens may be aspherical, and an image-side surface thereof may be aspherical. The fourth lens may be formed of a material having a high light transmissivity and an excellent workability. For example, the fourth lens may be formed of plastic. However, a material of the fourth lens is not limited to plastic. For example, the fourth lens may be formed of glass. The fourth lens may have a high refractive index. For example, the refractive index of the fourth lens may be 1.6 or greater.

The fifth lens may have a refractive power. For example, the fifth lens may have a positive refractive power. One surface of the fifth lens may be concave. For example, an object-side surface of the fifth lens may be concave. The fifth lens may have an inflection point. For example, an inflection point may be formed on an object-side surface of the fifth lens.

The fifth lens may have an aspherical surface. For example, both surfaces of the fifth lens may be aspherical. The fifth lens may be formed of a material having a high light transmissivity and an excellent workability. For example, the fifth lens may be formed of plastic. However, a material of the fifth lens is not limited to plastic. For example, the fifth lens may be formed of glass. The fifth lens may have a refractive index lower than that of the fourth lens. For example, the refractive index of the fifth lens may be less than 1.6.

The sixth lens may have a refractive power. For example, the sixth lens may have a negative refractive power. One surface of the sixth lens may be convex. For example, an object-side surface of the sixth lens may be convex. The sixth lens may have an inflection point. For example, an inflection point may be formed on either one or both of an object-side surface of the sixth lens and an image-side surface of the sixth lens.

The sixth lens may have an aspherical surface. For example, both surfaces of the sixth lens may be aspherical. The sixth lens may be formed of a material having a high light transmissivity and an excellent workability. For example, the sixth lens may be formed of plastic. However, a material of the sixth lens is not limited to plastic. For example, the sixth lens may be formed of glass. The sixth lens may have a low refractive index. For example, the refractive index of the sixth lens may be less than 1.6.

The aspherical surfaces of the first to sixth lenses may be represented by the following Equation 1:

$$Z = \frac{cr^2}{1+\sqrt{1-(1+k)c^2r^2}} + Ar^4 + Br^6 + Cr^8 + Dr^{10} + Er^{12} + Fr^{14} + Gr^{16} + Hr^{18} + Jr^{20} \qquad (1)$$

In Equation 1, c is an inverse of a radius of curvature of the lens, k is a conic constant, r is a distance from a certain point on an aspherical surface of the lens to an optical axis of the lens in a direction perpendicular to the optical axis, A to J are aspherical constants, and Z (or Sag) is a distance parallel to the optical axis between the certain point on the aspherical surface of the lens at the distance r and a tangential plane perpendicular to the optical axis and meeting the apex of the aspherical surface of the lens.

The optical imaging system may further include a filter, an image sensor, and a stop.

The filter may be disposed between the sixth lens and the image sensor. The filter may block some wavelengths of light. For example, the filter may block infrared wavelengths of light.

The image sensor may form the imaging plane. For example, a surface of the image sensor may form the imaging plane.

The stop may be disposed to control an amount of light incident to the image sensor. For example, the stop may be disposed between the first and second lenses.

The optical imaging system may satisfy any one or any combination of any two or more of the following Conditional Expressions:

| | |
|---|---|
| $F\ No.<2.5$ | (Conditional Expression 1) |
| $50 \leq FOV$ | (Conditional Expression 2) |
| $TTL/f<1.0$ | (Conditional Expression 3) |
| $0.52<f1/f<0.57$ | (Conditional Expression 4) |
| $D34/D45<1.0$ | (Conditional Expression 5) |
| $1.65 \leq Nd2$ | (Conditional Expression 6) |
| $1.6 \leq Nd3$ | (Conditional Expression 7) |
| $1.6 \leq Nd4$ | (Conditional Expression 8) |
| $0.5<DT4/D45<1.0$ | (Conditional Expression 9) |
| $0.1<DP45<0.3$ | (Conditional Expression 10) |
| $1.0<(Nd2*2)/(Nd3+Nd4)$ | (Conditional Expression 11) |

Figure 7:
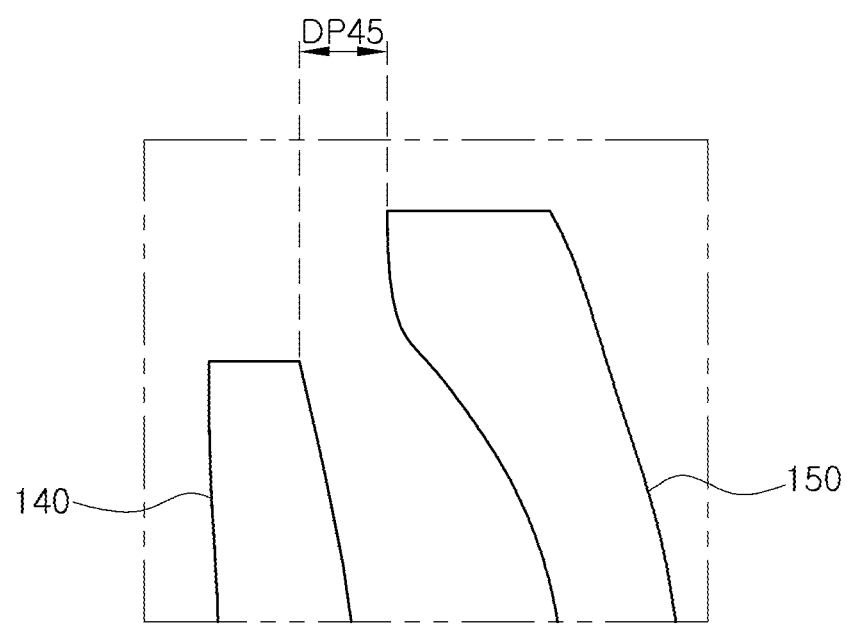
FIG. 7 is an enlarged view of edge portions of a fourth lens and a fifth lens illustrated in FIG. 1.

In the above Conditional Expressions, F No. is an f-number of the optical imaging system, FOV is an entire field of view of the optical imaging system, TTL is a distance from the object-side surface of the first lens to the imaging plane, f is an overall focal length of the optical imaging system, f1 is a focal length of the first lens, D34 is a distance from an image-side surface of the third lens to the object-side surface of the fourth lens, D45 is a distance from the image-side surface of the fourth lens to the object-side surface of the fifth lens, Nd2 is a refractive index of the second lens, Nd3 is a refractive index of the third lens, Nd4 is a refractive index of the fourth lens, DT4 is a thickness of the fourth lens, and DP45 is a distance from an edge of the image-side surface of the fourth lens to an edge of the object-side surface of the fifth lens as illustrated in FIG. 7.

Next, several examples of an optical imaging system will be described.

FIG. 1 is a view illustrating a first example of an optical imaging system.

Referring to FIG. 1, an optical imaging system 100 according to the first example includes a first lens 110, a second lens 120, a third lens 130, a fourth lens 140, a fifth lens 150, and a sixth lens 160.

The first lens 110 has a positive refractive power, and an object-side surface thereof is convex and an image-side surface thereof is concave. The second lens 120 has a negative refractive power, and an object-side surface thereof is concave and an image-side surface thereof is concave. The third lens 130 has a negative refractive power, and an object-side surface thereof is convex and an image-side surface thereof is concave. Six inflection points are formed on the object-side surface of the third lens 130. The fourth lens 140 has a positive refractive power, and an object-side surface thereof is convex and an image-side surface thereof is convex. The fifth lens 150 has a positive refractive power, and an object-side surface thereof is concave and an image-side surface thereof is convex. An inflection point is formed on the object-side surface of the fifth lens 150. The sixth lens 160 has a negative refractive power, and an object-side surface thereof is convex and an image-side surface thereof is concave. An inflection point is formed on each of the object-side surface of the sixth lens 160 and the image side surface of the sixth lens 160.

The optical imaging system 100 further includes a filter 170, an image sensor 180, and a stop ST. The filter 170 is disposed between the sixth lens 160 and the image sensor 180, and the stop ST is disposed between the first lens 110 and the second lens 120, but the stop ST is not limited to this position.

In the optical imaging system 100, the second lens 120 to the fourth lens 140 have refractive indices higher than those of the other lenses. In this example, all of the refractive indices of the second lens 120 to the fourth lens 140 are 1.6 or greater. The second lens 120 has the greatest refractive index. In this example, the refractive index of the second lens 120 is 1.65 or greater. The sixth lens 160 has the lowest refractive index. In this example, the refractive index of the sixth lens 160 is less than 1.54.

Figure 2:
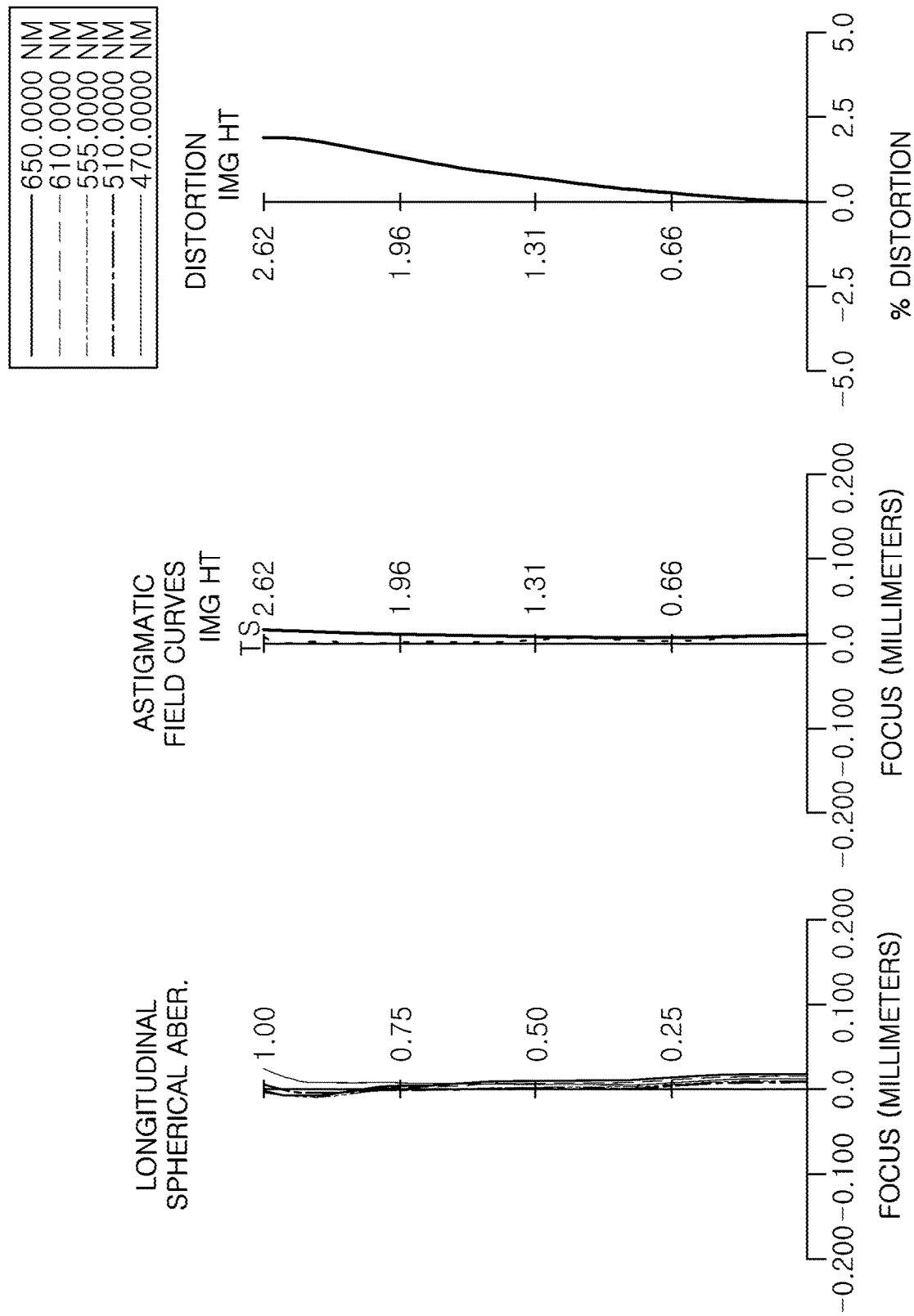
FIG. 2 illustrates aberration curves of the optical imaging system illustrated in FIG. 1.

FIG. 2 illustrates aberration characteristics of the optical imaging system illustrated in FIG. 1.

Table 1 below lists characteristics of the optical imaging system illustrated in FIG. 1, and Table 2 below lists aspherical values of the lens surfaces of the optical imaging system illustrated in FIG. 1.

TABLE 1

First Example
f = 5.18
FOV = 52.9
F No. = 2.46
TTL = 5.095

| Surface No. | Element | Radius of Curvature | Thickness/ Distance | Refractive Index | Abbe Number | Focal Length |
|---|---|---|---|---|---|---|
| S1 | First Lens | 1.4245 | 0.6949 | 1.546 | 56.114 | 2.762 |
| S2 |  | 21.3719 | 0.1453 |  |  |  |
| S3 | Second Lens | −13.8981 | 0.2300 | 1.667 | 20.353 | −6.245 |
| S4 |  | 5.9870 | 0.2005 |  |  |  |
| S5 | Third Lens | 5.5554 | 0.2300 | 1.644 | 23.517 | −9.595 |
| S6 |  | 2.8779 | 0.5528 |  |  |  |
| S7 | Fourth Lens | 11.3944 | 0.4277 | 1.644 | 23.517 | 10.266 |
| S8 |  | −15.5182 | 0.6339 |  |  |  |
| S9 | Fifth Lens | −4.2835 | 0.3500 | 1.546 | 56.114 | 120.163 |
| S10 |  | −4.1370 | 0.1728 |  |  |  |
| S11 | Sixth Lens | 11.8502 | 0.4000 | 1.536 | 55.650 | −5.421 |
| S12 |  | 2.3063 | 0.6000 |  |  |  |
| S13 | Filter | Infinity | 0.2100 | 1.518 | 64.197 |  |
| S14 |  | Infinity | 0.2572 |  |  |  |
| S15 | Imaging Plane | Infinity | −0.0100 |  |  |  |

TABLE 2

| First Example | S1 | S2 | S3 | S4 | S5 | S6 |
|---|---|---|---|---|---|---|
| Radius of Curvature | 1.424510 | 21.371874 | −13.898056 | 5.986980 | 5.555425 | 2.877888 |
| k | −0.805255 | 0.231516 | 0.749858 | 10.000000 | 0.000000 | 0.000000 |
| A | 0.033940 | 0.007941 | 0.029587 | −0.103542 | −0.465097 | −0.351097 |
| B | 0.042357 | 0.032732 | 0.111283 | 0.462557 | 0.841756 | 0.695337 |
| C | −0.186735 | −0.125043 | 0.130731 | −0.334346 | −0.666780 | −0.510106 |
| D | 0.567629 | 0.264877 | −1.143529 | −0.547535 | 0.433373 | 0.181153 |
| E | −0.948738 | −0.309931 | 2.817662 | 2.817662 | −0.484927 | −0.025525 |
| F | 0.893679 | 0.170829 | −3.982922 | −4.267172 | 0.393581 | −0.002657 |
| G | −0.438975 | −0.041433 | 2.690128 | 2.569727 | −0.151385 | 0.001262 |
| H | 0.085225 | 0.003343 | −0.712788 | −0.342539 | 0.021696 | −0.000107 |
| J | 0 | 0 | 0 | 0 | 0 | 0 |

TABLE 2-continued

| First Example | S7 | S8 | S9 | S10 | S11 | S12 |
|---|---|---|---|---|---|---|
| Radius of Curvature | 11.394411 | −15.518223 | −4.283541 | −4.137005 | 11.850202 | 2.306315 |
| k | −0.327507 | 0.931643 | −7.873515 | 0.090826 | 15.991895 | −0.277581 |
| A | −0.137905 | −0.120785 | −0.019598 | 0.044283 | −0.251420 | −0.309234 |
| B | 0.039918 | 0.006434 | −0.258912 | −0.194897 | 0.159818 | 0.241318 |
| C | 0.014958 | 0.045598 | 0.319186 | 0.204235 | −0.049111 | −0.161637 |
| D | 0.080229 | −0.026466 | −0.263217 | −0.096895 | 0.008928 | 0.079981 |
| E | −0.126227 | 0.028323 | 0.192072 | 0.024332 | −0.001020 | −0.027632 |
| F | 0.078374 | −0.021504 | −0.098427 | −0.003354 | 0.000071 | 0.006376 |
| G | −0.024160 | 0.006683 | 0.026932 | 0.000240 | −0.000003 | −0.000922 |
| H | 0.002975 | −0.000713 | −0.002873 | −0.000007 | 0.000000 | 0.000075 |
| J | 0 | 0 | 0 | 0 | 0 | −0.000003 |

Figure 3:
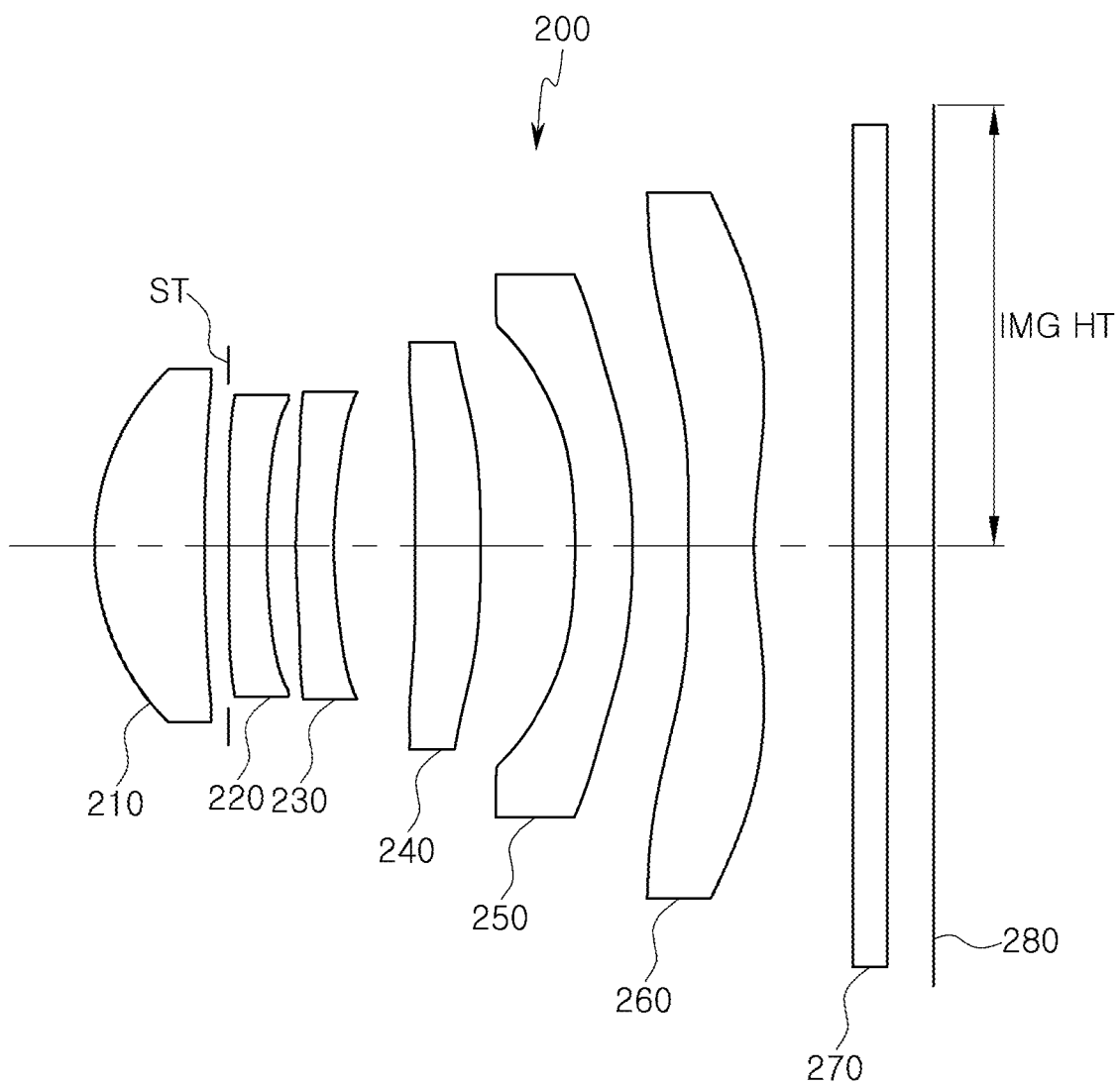
FIG. 3 is a view illustrating a second example of n optical imaging system.

FIG. 3 is a view illustrating a second example of an optical imaging system.

Referring to FIG. 3, an optical imaging system 200 according to the second example includes a first lens 210, a second lens 220, a third lens 230, a fourth lens 240, a fifth lens 250, and a sixth lens 260.

The first lens 210 has a positive refractive power, and an object-side surface thereof is convex and an image-side surface thereof is concave. The second lens 220 has a negative refractive power, and an object-side surface thereof is concave and an image-side surface thereof is concave. The third lens 230 has a negative refractive power, and an object-side surface thereof is convex and an image-side surface thereof is concave. Four inflection points are formed on the object-side surface of the third lens 230. The fourth lens 240 has a positive refractive power, and an object-side surface thereof is convex and an image-side surface thereof is convex. The fifth lens 250 has a positive refractive power, and an object-side surface thereof is concave and an image-side surface thereof is convex. An inflection point is formed on the object-side surface of the fifth lens 250. The sixth lens 260 has a negative refractive power, and an object-side surface thereof is convex and an image-side surface thereof is concave. An inflection point is formed on each of the object-side surface of the sixth lens 260 and the image-side surface of the sixth lens 260.

The optical imaging system 200 further includes a filter 270, an image sensor 280, and a stop ST. The filter 270 is disposed between the sixth lens 260 and the image sensor 280, and the stop ST is disposed between the first lens 210 and the second lens 220, but the stop ST is not limited to this position.

In the optical imaging system 200, the second lens 220 to the fourth lens 240 have refractive indices higher than those of the other lenses. In this example, all of the refractive indices of the second lens 220 to the fourth lens 240 are 1.6 or greater. The second lens 220 has the greatest refractive index. In this example, the refractive index of the second lens 220 is 1.65 or greater. The sixth lens 260 has the lowest refractive index. In this example, the refractive index of the sixth lens 260 is less than 1.54.

Figure 4:
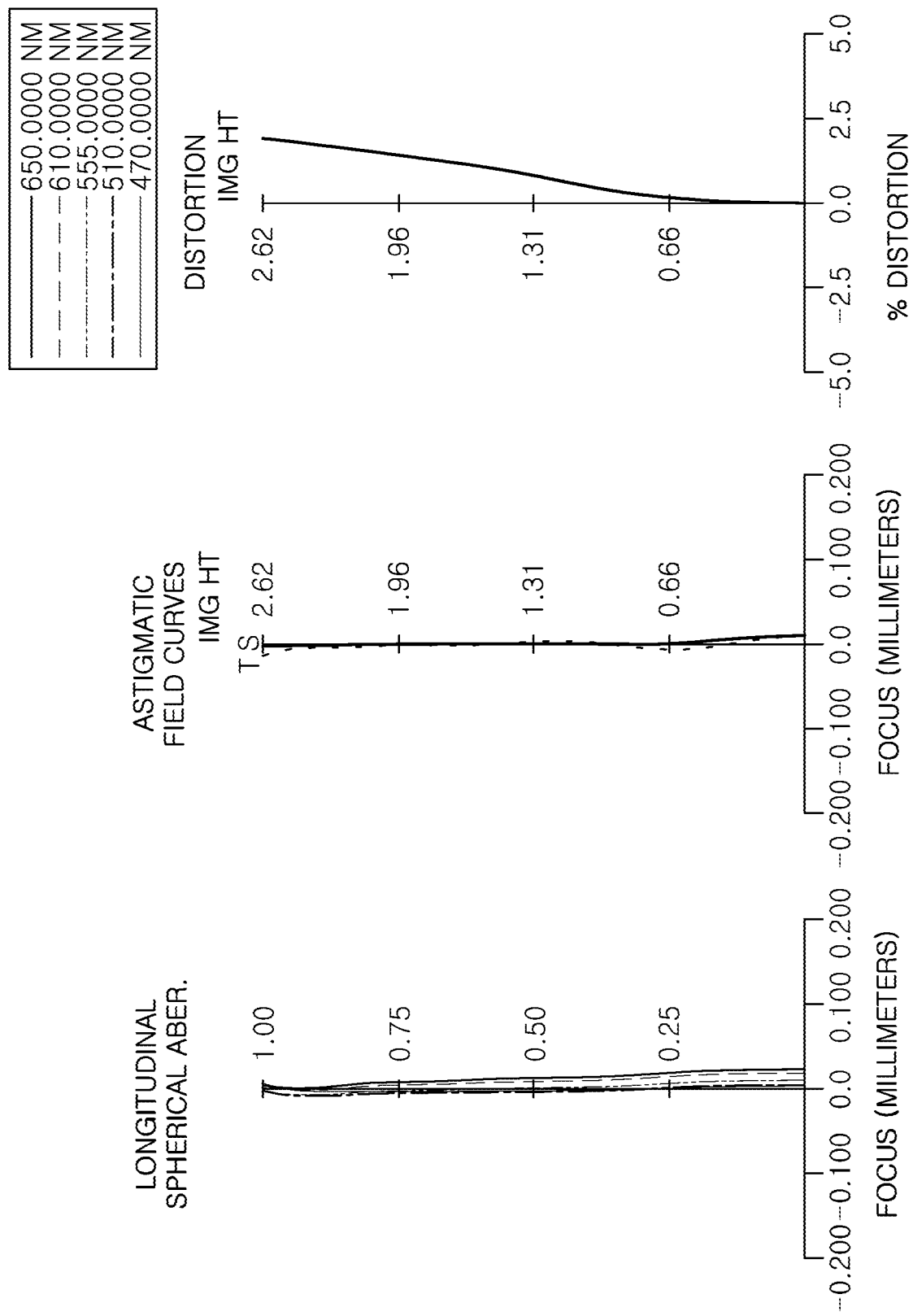
FIG. 4 illustrates aberration curves of the optical imaging system illustrated in FIG. 3.

FIG. 4 illustrates aberration characteristics of the optical imaging system illustrated in FIG. 3.

Table 3 below lists characteristics of the optical imaging system illustrated in FIG. 3, and Table 4 below lists aspherical values of the lens surfaces of the optical imaging system illustrated in FIG. 3.

TABLE 3

Second Example
f = 5.20
FOV = 52.7
F No. = 2.40
TTL = 5.097

| Surface No. | Element | Radius of Curvature | Thickness/ Distance | Refractive Index | Abbe Number | Focal Length |
|---|---|---|---|---|---|---|
| S1 | First Lens | 1.4381 | 0.6675 | 1.546 | 56.114 | 2.94 |
| S2 | | 11.5422 | 0.1490 | | | |
| S3 | Second Lens | −86.7587 | 0.2300 | 1.667 | 20.353 | −6.62 |
| S4 | | 4.6579 | 0.1760 | | | |
| S5 | Third Lens | 3.8452 | 0.2300 | 1.644 | 23.517 | −14.82 |
| S6 | | 2.6767 | 0.4928 | | | |
| S7 | Fourth Lens | 26.6385 | 0.3984 | 1.644 | 23.517 | 12.79 |
| S8 | | −11.8563 | 0.5771 | | | |
| S9 | Fifth Lens | −4.4041 | 0.3500 | 1.546 | 56.114 | 136.99 |
| S10 | | −4.2759 | 0.3362 | | | |
| S11 | Sixth Lens | 15.8023 | 0.4000 | 1.536 | 55.650 | −5.62 |
| S12 | | 2.5072 | 0.6000 | | | |
| S13 | Filter | Infinity | 0.2100 | 1.518 | 64.197 | |
| S14 | | Infinity | 0.2897 | | | |
| S15 | Imaging Plane | Infinity | −0.0100 | | | |

TABLE 4

| Second Example | S1 | S2 | S3 | S4 | S5 | S6 |
|---|---|---|---|---|---|---|
| Radius of Curvature | 1.438129 | 11.542215 | −86.758656 | 4.657875 | 3.845240 | 2.676661 |

TABLE 4-continued

|   | | | | | | |
|---|---|---|---|---|---|---|
| k | −0.792023 | 0.231531 | 0.749825 | 0.911982 | 0.000000 | 0.000000 |
| A | 0.030023 | −0.006620 | 0.045000 | 0.015563 | −0.227531 | −0.183493 |
| B | 0.027812 | 0.009737 | 0.005582 | 0.045000 | 0.092340 | 0.154880 |
| C | −0.101290 | 0.018704 | 0.044999 | 0.045000 | 0.159495 | 0.027769 |
| D | 0.310506 | −0.051355 | −0.017357 | 0.045000 | −0.037518 | 0.187770 |
| E | −0.514924 | 0.093215 | −0.026253 | 0.005758 | −0.133757 | −0.347773 |
| F | 0.482475 | −0.110518 | 0.023966 | −0.045000 | 0.099510 | 0.204436 |
| G | −0.234836 | 0.055977 | −0.028321 | −0.045000 | −0.026370 | −0.051954 |
| H | 0.044612 | −0.009707 | 0.019656 | 0.107000 | 0.002450 | 0.004923 |
| J | 0 | 0 | 0 | 0 | 0 | 0 |

| Second Example | S7 | S8 | S9 | S10 | S11 | S12 |
|---|---|---|---|---|---|---|
| Radius of Curvature | 26.638465 | −11.856336 | −4.404092 | −4.275889 | 15.802291 | 2.507248 |
| k | −0.327500 | 0.868247 | −7.862036 | −3.748801 | 16.029987 | −0.028228 |
| A | −0.119145 | −0.130748 | −0.091293 | −0.029846 | −0.213774 | −0.257704 |
| B | 0.079453 | 0.071995 | −0.282112 | −0.129297 | 0.152238 | 0.191432 |
| C | −0.236888 | −0.121672 | 0.632463 | 0.230979 | −0.058845 | −0.123253 |
| D | 0.606801 | 0.195872 | −0.804649 | −0.153612 | 0.014140 | 0.056996 |
| E | −0.636361 | −0.093224 | 0.720551 | 0.051642 | −0.002092 | −0.018112 |
| F | 0.336913 | −0.006990 | −0.409758 | −0.009311 | 0.000179 | 0.003798 |
| G | −0.093673 | 0.013782 | 0.124895 | 0.000859 | −0.000008 | −0.000495 |
| H | 0.010954 | −0.002339 | −0.015188 | −0.000032 | 0.000000 | 0.000036 |
| J | 0 | 0 | 0 | 0 | 0 | −0.000001 |

Figure 5:
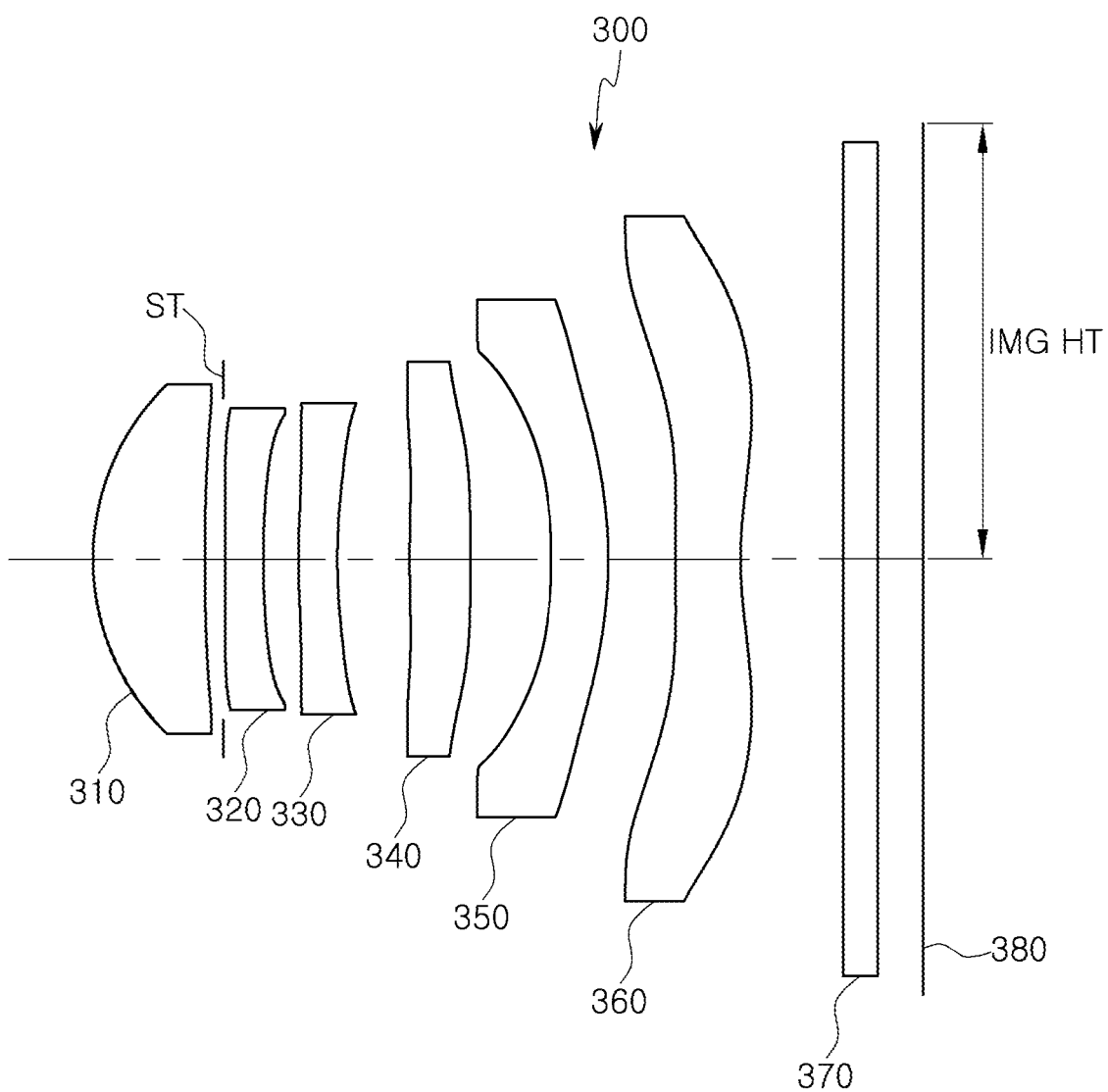
FIG. 5 is a view illustrating a third example of an optical imaging system.

FIG. 5 is a view illustrating a third example of an optical imaging system.

Referring to FIG. 3, an optical imaging system 300 includes a first lens 310, a second lens 320, a third lens 330, a fourth lens 340, a fifth lens 350, and a sixth lens 360.

The first lens 310 has a positive refractive power, and an object-side surface thereof is convex and an image-side surface thereof is concave. The second lens 320 has a negative refractive power, and an object-side surface thereof is concave and an image-side surface thereof is concave. The third lens 330 has a negative refractive power, and an object-side surface thereof is convex and an image-side surface thereof is concave. Six inflection points are formed on the object-side surface of the third lens 330. The fourth lens 340 has a positive refractive power, and an object-side surface thereof is convex and an image-side surface thereof is convex. The fifth lens 350 has a positive refractive power, and an object-side surface thereof is concave and an image-side surface thereof is convex. An inflection point is formed on the object-side surface of the fifth lens 350. The sixth lens 360 has a negative refractive power, and an object-side surface thereof is convex and an image-side surface thereof is concave. An inflection point is formed on each of the object-side surface of the sixth lens 360 and the image-side surface of the sixth lens 360.

The optical imaging system 300 further includes a filter 370, an image sensor 380, and a stop ST. The filter 370 is disposed between the sixth lens 360 and the image sensor 380, and the stop ST is disposed between the first lens 310 and the second lens 320, but the stop ST is not limited to this position.

In the optical imaging system 300, the second lens 320 to the fourth lens 340 have refractive indices higher than those of the other lenses. In this example, all of the refractive indices of the second lens 320 to the fourth lens 340 are 1.6 or greater. The second lens 320 has the greatest refractive index. In this example, the refractive index of the second lens 320 is 1.65 or greater. The sixth lens 360 has the lowest refractive index. In this example, the refractive index of the sixth lens 360 is less than 1.54.

Figure 6:
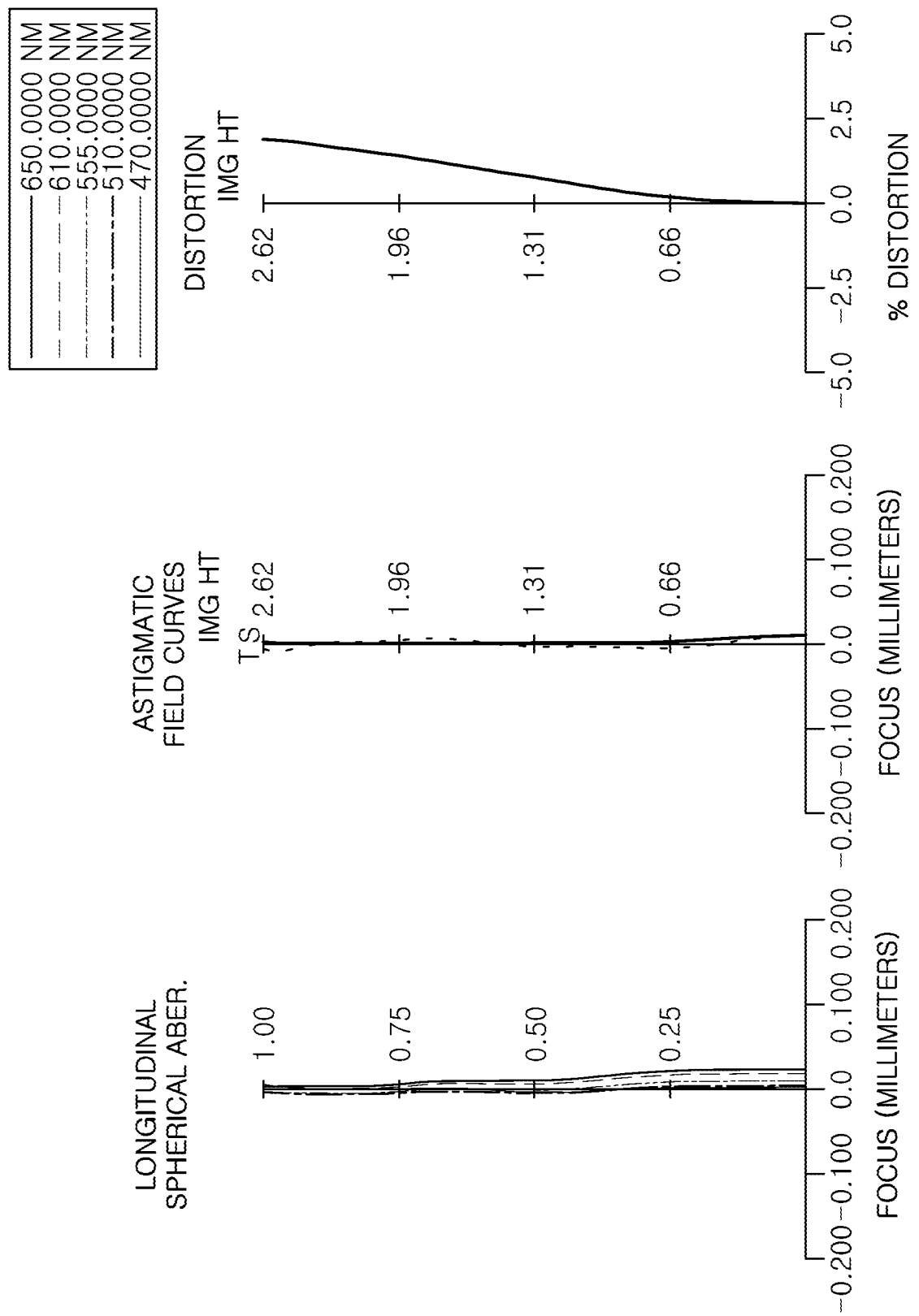
FIG. 6 illustrates aberration curves of the optical imaging system illustrated in FIG. 5.

FIG. 6 illustrates aberration characteristics of the optical imaging system illustrated in FIG. 5.

Table 5 below lists characteristics of the optical imaging system illustrated in FIG. 5, and Table 6 below lists aspherical values of the lens surfaces of the optical imaging system illustrated in FIG. 5.

TABLE 5

Third Example
f = 5.20
FOV = 52.7
F No. = 2.47
TTL = 5.097

| Surface No. | Element | Radius of Curvature | Thickness/ Distance | Refractive Index | Abbe Number | Focal Length |
|---|---|---|---|---|---|---|
| S1 | First Lens | 1.4336 | 0.6856 | 1.546 | 56.114 | 2.94 |
| S2 | | 11.2062 | 0.1269 | | | |
| S3 | Second Lens | −33.4236 | 0.2325 | 1.667 | 20.353 | −6.88 |
| S4 | | 5.3309 | 0.2153 | | | |
| S5 | Third Lens | 4.8308 | 0.2377 | 1.644 | 23.517 | −13.37 |
| S6 | | 3.0348 | 0.4445 | | | |
| S7 | Fourth Lens | 10.3957 | 0.3725 | 1.644 | 23.517 | 11.89 |
| S8 | | −28.6398 | 0.4995 | | | |
| S9 | Fifth Lens | −2.7135 | 0.3500 | 1.546 | 56.114 | 47.80 |
| S10 | | −2.5699 | 0.4115 | | | |
| S11 | Sixth Lens | 14.3889 | 0.4000 | 1.536 | 55.650 | −5.11 |

TABLE 5-continued

Third Example
f = 5.20
FOV = 52.7
F No. = 2.47
TTL = 5.097

| Surface No. | Element | Radius of Curvature | Thickness/ Distance | Refractive Index | Abbe Number | Focal Length |
|---|---|---|---|---|---|---|
| S12 | | 2.2773 | 0.6300 | | | |
| S13 | Filter | Infinity | 0.2100 | 1.518 | 64.197 | |
| S14 | | Infinity | 0.2908 | | | |
| S15 | Imaging Plane | Infinity | -0.0100 | | | |

TABLE 6

| Third Example | S1 | S2 | S3 | S4 | S5 | S6 |
|---|---|---|---|---|---|---|
| Radius of Curvature | 1.433570 | 11.206191 | -33.423578 | 5.330903 | 4.830810 | 3.034801 |
| k | -0.778146 | 0.231531 | 0.100000 | 0.100000 | 1.056224 | -0.807369 |
| A | 0.034307 | -0.005289 | 0.025000 | 0.014955 | -0.194002 | -0.156432 |
| B | -0.004493 | -0.044471 | 0.025000 | 0.045000 | 0.006183 | 0.021831 |
| C | 0.105082 | 0.306088 | 0.024755 | 0.045000 | 0.330325 | 0.364204 |
| D | -0.365244 | -0.905257 | 0.025000 | 0.045000 | -0.816773 | -0.545066 |
| E | 0.724763 | 1.604151 | 0.001886 | 0.045000 | 2.017686 | 0.412711 |
| F | -0.803614 | -1.620327 | -0.025000 | 0.035080 | -2.874559 | 0.366643 |
| G | 0.470809 | 0.848014 | -0.025000 | -0.009570 | 2.132120 | -0.950634 |
| H | -0.114982 | -0.184693 | 0.015458 | -0.069984 | -0.709461 | 0.463640 |
| J | 0 | 0 | 0 | 0 | 0 | 0 |

| Third Example | S7 | S8 | S9 | S10 | S11 | S12 |
|---|---|---|---|---|---|---|
| Radius of Curvature | 10.395726 | -28.639800 | -2.713499 | -2.569860 | 14.388878 | 2.277278 |
| k | -0.327500 | 0.868247 | -7.862036 | -7.226317 | 16.029987 | 0.059056 |
| A | -0.105461 | -0.103005 | -0.016801 | 0.047921 | -0.191682 | -0.285858 |
| B | -0.077993 | -0.105168 | -0.269163 | -0.120835 | 0.120853 | 0.218788 |
| C | 0.230192 | 0.296703 | 0.312986 | 0.019549 | -0.063008 | -0.167680 |
| D | -0.335702 | -0.512904 | -0.235249 | 0.175814 | 0.033712 | 0.099816 |
| E | 0.650596 | 0.782773 | 0.289946 | -0.197408 | -0.014344 | -0.043004 |
| F | -0.728282 | -0.677921 | -0.268626 | 0.092301 | 0.003895 | 0.012674 |
| G | 0.376863 | 0.285563 | 0.109640 | -0.020451 | -0.000575 | -0.002409 |
| H | -0.073753 | -0.046291 | -0.015173 | 0.001764 | 0.000035 | 0.000265 |
| J | 0 | 0 | 0 | 0 | 0 | -0.000013 |

Table 7 below list values of Conditional Expressions of the optical imaging systems according to the first to third exemplary embodiments.

TABLE 7

| Conditional Expression | First Example | Second Example | Third Example |
|---|---|---|---|
| F No. | 2.460 | 2.400 | 2.470 |
| FOV | 52.90 | 52.70 | 52.70 |
| TTL/f | 0.9844 | 0.9811 | 0.9811 |
| f1/f | 0.5336 | 0.5660 | 0.5656 |
| D34/D45 | 0.8720 | 0.8538 | 0.8898 |
| Nd2 | 1.6669 | 1.6669 | 1.6669 |
| Nd3 | 1.6440 | 1.6440 | 1.6440 |
| Nd4 | 1.6440 | 1.6440 | 1.6440 |
| DT4/D45 | 0.6747 | 0.6903 | 0.7457 |
| DP45 | 0.2640 | 0.2490 | 0.1690 |
| (Nd2*2)/(Nd3 + Nd4) | 1.0139 | 1.0139 | 1.0139 |

The examples described above enable an optical imaging system appropriate for a small camera module having a high performance may be implemented.

While this disclosure includes specific examples, it will be apparent to after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system comprising:
a first lens, a second lens, a third lens, a fourth lens, a fifth lens, and a sixth lens sequentially arranged in numerical order from an object side of the optical imaging system toward an imaging plane of the optical imaging system and each having a refractive power,
wherein an entire field of view of the optical imaging system is 50° or greater, TTL/f<1.0, where TTL is a distance from an object-side surface of the first lens to the imaging plane, and f is an overall focal length of the optical imaging system, and D34/D45<1.0, where D34 is a distance from an image-side surface of the third lens to an object-side surface of the fourth lens, and D45 is a distance from an image-side surface of the fourth lens to an object-side surface of the fifth lens.

2. The optical imaging system of claim 1, wherein a plurality of inflection points are formed on an object-side surface of the third lens.

3. The optical imaging system of claim 1, wherein 0.52<f1/f<0.57, where f is the overall focal length of the optical imaging system, and f1 is a focal length of the first lens.

4. The optical imaging system of claim 1, wherein 1.6<Nd2, where Nd2 is a refractive index of the second lens.

5. The optical imaging system of claim 1, wherein 1.6<Nd3, where Nd3 is a refractive index of the third lens.

6. The optical imaging system of claim 1, wherein 1.6<Nd4, where Nd4 is a refractive index of the fourth lens.

7. An optical imaging system comprising:
a first lens, a second lens, a third lens, a fourth lens, a fifth lens, and a sixth lens sequentially arranged in numerical order from an object side of the optical imaging system toward an imaging plane of the optical imaging system,
wherein the second lens has a negative refractive power, the fifth lens has a positive refractive power,
TTL/f<1.0, where TTL is a distance from an object-side surface of the first lens to the imaging plane, and f is an overall focal length of the optical imaging system, and
an inflection point is formed on each of an object-side surface of the sixth lens and an image-side surface of the sixth lens.

8. The optical imaging system of claim 7, wherein 0.5<DT4/D45<1.0, where DT4 is a thickness of the fourth lens, and D45 is a distance from an image-side surface of the fourth lens to an object-side surface of the fifth lens.

9. The optical imaging system of claim 7, wherein an image-side surface of the second lens is concave.

10. The optical imaging system of claim 7, wherein an object-side surface of the fourth lens is convex.

11. The optical imaging system of claim 7, wherein an image-side surface of the fifth lens is concave.

12. The optical imaging system of claim 7, wherein an object-side surface of the sixth lens is convex.

13. The optical imaging system of claim 7, further comprising a stop disposed between the first lens and the second lens.

14. The optical imaging system of claim 7, wherein four inflection points are formed on an object-side surface of the third lens.

15. An optical imaging system comprising:
a first lens, a second lens, a third lens, a fourth lens, a fifth lens, and a sixth lens sequentially arranged in numerical order from an object side of the optical imaging system toward an imaging plane of the optical imaging system and each having a refractive power,
wherein at least four inflection points are formed on an object-side surface of the third lens,
an inflection point is formed on an object-side surface of the fifth lens,
an inflection point is formed on each of an object-side surface of the sixth lens and an image-side surface of the sixth lens,
an entire field of view of the optical imaging system is 50° or greater, and
TTL/f<1.0, where TTL is a distance from an object-side surface of the first lens to the imaging plane, and
f is an overall focal length of the optical imaging system.

16. The optical imaging system of claim 15, wherein the second lens has a negative refractive power, and
the fifth lens has a positive refractive power.

17. The optical imaging system of claim 15, wherein respective refractive indices of the second lens, the third lens, and the fourth lens are greater than respective refractive indices of the first lens, the fifth lens, and the sixth lens.

* * * * *